United States Patent
Goto

[11] 4,206,977
[45] Jun. 10, 1980

[54] REPRODUCING OBJECTIVE FOR VIDEO DISKS

[75] Inventor: Atsuo Goto, Tachikawa, Japan

[73] Assignee: Olympus Optical Co., Ltd., Tokyo, Japan

[21] Appl. No.: 938,256

[22] Filed: Aug. 30, 1978

[30] Foreign Application Priority Data
Sep. 13, 1977 [JP] Japan .................. 52-110240

[51] Int. Cl.² ............................... G02B 9/34
[52] U.S. Cl. ........................ 350/220; 350/175 ML
[58] Field of Search ................. 350/220, 175 ML

[56] References Cited
FOREIGN PATENT DOCUMENTS
607631 1/1935 Fed. Rep. of Germany ........... 350/220
572086 9/1945 United Kingdom .................. 350/220

*Primary Examiner*—Paul A. Sacher
*Attorney, Agent, or Firm*—Cushman, Darby & Cushman

[57] ABSTRACT

A reproducing objective for video disks comprising a first, second, third and fourth lenses in which the first lens is a biconvex lens, the second lens is a negative meniscus lens, and the third and fourth lenses are positive lenses and for which the working distance is large, flatness of image is high, resolving power is high and weight is extremely light.

4 Claims, 6 Drawing Figures

SPHERICAL
ABERRATION
SINE
CONDITION
NA 0.45

ASTIGMATISM
H' 0.0426

DISTORTION
H' 0.0426

REPRODUCING OBJECTIVE FOR VIDEO DISKS

BACKGROUND OF THE INVENTION (a) Field of the Invention

The present invention relates to a medium magnification objective for video disks and, more particularly, to a medium magnification objective for reading out the signals recorded on high-density information-recording disks (video disks).

(b) Description of the Prior Art

For objectives to be used in reproducing systems for video disks, it is required to warrant resolving power of 1 $\mu$ due to the fact that the objective has to read out very small signals recorded with high density. Moreover, the information read out from the disk, which rotates at high speed, contains signals for making the objective follow up the recorded track and signals for automatic focusing in addition to image information. To make the objective read out those information and signals correctly, the flatness of image focused by the objective should be high. To prevent breakage of the video disk and objective which will be caused when the objective contacts the video disk, the working distance of the objective should be long. Besides, to perform automatic focusing, the objective should be compact and light in weight. Moreover, the price of the objective should be low.

As the light used for the objective for video disks is generally a monochromatic light ($\lambda = 6328\text{Å}$), it is effective for eliminating the noise at the time of amplifying the signals from a detector when transparency for the light of this wavelength is as high as possible. Therefore, to make transparency high, it is necessary to provide multi-layer anti-reflection coating on the lens surface or to make the number of lenses constituting the objective as small as possible. When this problem is considered in connection with the above-mentioned other requirements such as low price and light weight, it is more advantageous when the number of lenses constituting the objective is made as small as possible.

Though there are some known lens systems which meet the above-mentioned requirements, they are not satisfactorily light in weight.

SUMMARY OF THE INVENTION

It is, therefore, a primary object of the present invention to provide a reproducing objective for video disks for which the working distance is large, flatness of image is high and resolving power is high and, moreover, which is extremely light in weight.

The reproducing objective for video disks according to the present invention comprises a first, second, third and fourth lenses in the order from the reproducing light source side. The first lens is a biconvex lens, the second lens is a negative meniscus lens, the third lens is a positive lens and the fourth lens is a positive lens. Besides, the objective according to the present invention satisfies the following conditions when reference symbol $r_3$ represents the radius of curvature of the surface on the light source side of the second lens, reference symbol $r_7$ represents the radius of curvature of the surface on the light source side of the fourth lens component, reference symbol $d_4$ represents the airspace between the second and third lenses, reference symbols $n_1$, $n_2$, $n_3$ and $n_4$ respectively represent refractive indices of respective lenses, and reference symbol f represents the focal length of the lens system as a whole.

(1) $-1.5f < r_3 < -0.9f$
(2) $0.7f < r_7 < 1.1f$
(3) $0.4f < d_4$
(4) $n_1, n_3, n_4 < 1.7$
(5) $n_2 < 1.6$

Out of the above conditions, the condition (1) is to cause positive spherical aberration of adequate value by the surface $r_3$ in order to favourably correct negative spherical aberration which is caused by convex surfaces in the lens system. If $r_3$ in the condition (1) becomes a stronger concave surface than $-0.9f$, spherical aberration will be overcorrected. If, on the contrary, $r_3$ becomes a weaker concave surface than $-1.5f$, spherical aberration will be undercorrected and it becomes impossible to favourably correct it by the other surfaces.

The condition (2) is to correct astigmatism. If $r_7$ becomes larger than or smaller than the range defined by the condition (2), considerable astigmatic difference will remain and the lens system will become unsuitable as the lens system for video disks. If $r_7$ becomes smaller than the lower limit $0.7f$ of the condition (2), astigmatic difference will be undercorrected. If $r_7$ becomes larger than the upper limit $1.1f$, astigmatic difference will be overcorrected.

The condition (3) is to favourably correct curvature of field by arranging the rear lens group comprising the third and fourth lenses at an adequate distance from the front lens group comprising the first and second lenses. If the airspace $d_4$ becomes smaller than $0.4f$ defined by the condition (3), flatness of image will become unfavourable and, to make the flatness of image favourable, it becomes necessary to arrange the surface $r_3$ as a strong concave surface. In that case, however, unfavourable influence will be caused on the other aberrations and, as a result, the imaging characteristic will become unfavourable.

The conditions (4) and (5) are to attain favourable flatness of image by making Petzval's sum small and are very effective for the lens system according to the present invention which is to be used with the monochromatic light. In short, it is possible to correct Petzval's sum without taking the influence of chromatic aberration into consideration. If these conditions are not satisfied, Petzval's sum will become larger than the allowable limit.

DETAILED DESCRIPTION OF THE PREFERRED EMBODIMENTS

Preferred embodiments of the reproducing objective for video disks according to the present invention explained in the above are as shown below.

| Embodiment 1 | | | |
|---|---|---|---|
| $r_1 = 2.9238$ | | | |
| | $d_1 = 0.3041$ | $n_1 = 1.77861$ | $\nu_1 = 25.7$ |
| $r_2 = -2.6473$ | | | |
| | $d_2 = 0.1825$ | | |
| $r_3 = 1.2166$ | | | |
| | $d_3 = 0.1217$ | $n_2 = 1.51462$ | $\nu_2 = 64.1$ |
| $r_4 = -4.1754$ | | | |
| | $d_4 = 0.5669$ | | |
| $r_5 = 1.5555$ | | | |
| | $d_5 = 0.1947$ | $n_3 = 1.77861$ | $\nu_3 = 25.7$ |
| $r_6 = 5.6725$ | | | |
| | $d_6 = 0.1642$ | | |
| $r_7 = 0.8831$ | | | |
| | $d_7 = 0.3759$ | $n_4 = 1.77861$ | $\nu_4 = 25.7$ |
| $r_8 = \infty$ | | | |
| | $f = 1.0$ | $\beta = 1/20X$ | N.A. $= 0.45$ |
| | $l_1 = 0.2676$ | $t = 0.1338$ | |

| Embodiment 2 | | | |
|---|---|---|---|
| $r_1 = 7.7767$ | | | |
| | $d_1 = 0.3034$ | $n_1 = 1.77861$ | $\nu_1 = 25.7$ |
| $r_2 = -2.3979$ | | | |
| | $d_2 = 0.2937$ | | |
| $r_3 = -0.9709$ | | | |
| | $d_3 = 0.1080$ | $n_2 = 1.51462$ | $\nu_2 = 64.1$ |
| $r_4 = -1.8606$ | | | |
| | $d_4 = 0.5425$ | | |
| $r_5 = 2.2864$ | | | |
| | $d_5 = 0.2027$ | $n_3 = 1.77861$ | $\nu_3 = 25.7$ |
| $r_6 = -13.2104$ | | | |
| | $d_6 = 0.1735$ | | |
| $r_7 = 0.9549$ | | | |
| | $d_7 = 0.3811$ | $n_4 = 1.77861$ | $\nu_4 = 25.7$ |
| $r_8 = \infty$ | | | |
| | $f = 1.0$ | $\beta = 1/20X$ | N.A. $= 0.45$ |
| | $l_1 = 0.3617$ | $t = 0.1335$ | |

| Embodiment 3 | | | |
|---|---|---|---|
| $r_1 = 2.8521$ | | | |
| | $d_1 = 0.3111$ | $n_1 = 1.77861$ | $\nu_1 = 25.7$ |
| $r_2 = -2.5399$ | | | |
| | $d_2 = 0.2348$ | | |
| $r_3 = -1.0728$ | | | |
| | $d_3 = 0.1001$ | $n_2 = 1.51462$ | $\nu_2 = 64.1$ |
| $r_4 = -2.7654$ | | | |
| | $d_4 = 0.5352$ | | |
| $r_5 = 1.3446$ | | | |
| | $d_5 = 0.2265$ | $n_3 = 1.77861$ | $\nu_3 = 25.7$ |
| $r_6 = 3.6180$ | | | |
| | $d_6 = 0.1847$ | | |
| $r_7 = 0.7797$ | | | |
| | $d_7 = 0.1788$ | $n_4 = 1.77861$ | $\nu_4 = 25.7$ |
| $r_8 = \infty$ | | | |
| | $f = 1.0$ | $\beta = 1/20X$ | N.A. $= 0.45$ |
| | $l_1 = 0.2980$ | $t = 0.1311$ | |

In the above embodiments, reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$ through $n_4$ respectively represent refractive indices of respective lenses at $\lambda = 6328\text{Å}$, reference symbols $\nu_1$ through $\nu_4$ respectively represent Abbe's numbers of respective lenses for d-line, reference symbol $\beta$ represents magnification when the light source is focused, reference symbol $l_1$ represents the distance from the final lens surface to the protective layer on the recording surface, and reference symbol $t$ represents the thickness of the above-mentioned protective layer.

Figure 1:
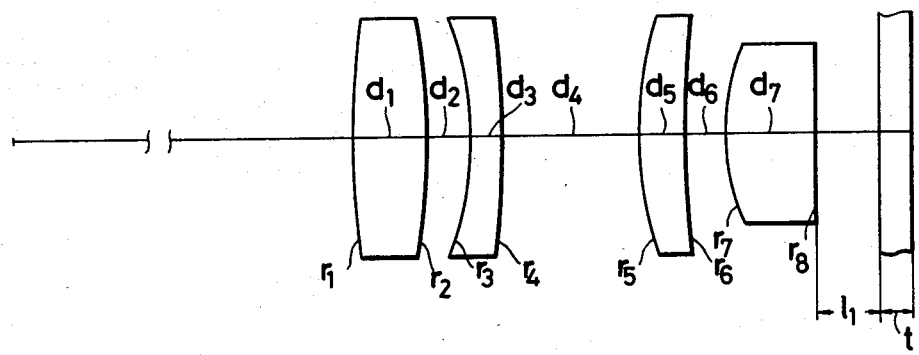
FIG. 1 shows a sectional view of Embodiment 1 of the present invention.
Figure 2:
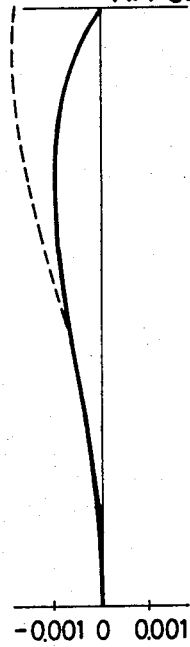
FIG. 2 shows graphs illustrating aberration curves of Embodiment 1.
Figure 2:
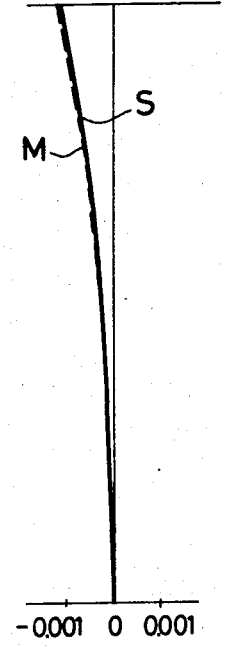
Figure 2:
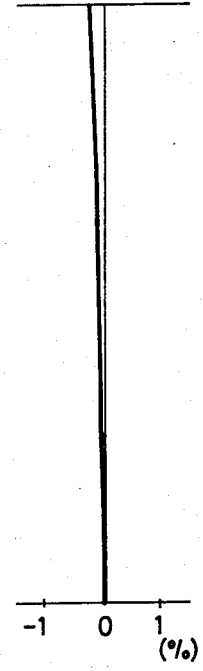
Figure 3:
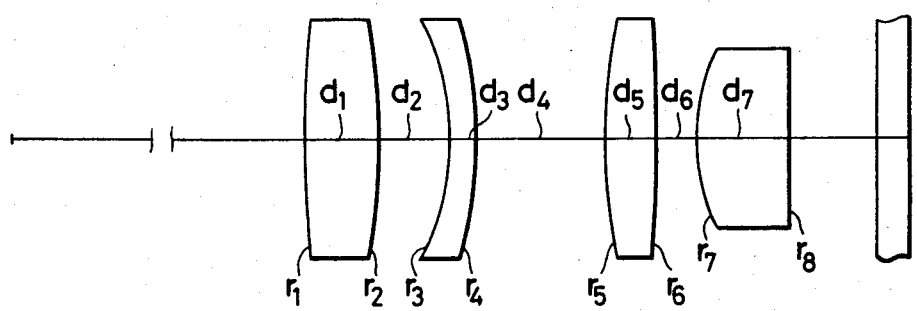
FIG. 3 shows a sectional view of Embodiment 2.
Figure 4:
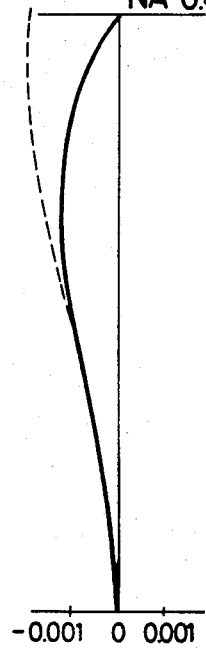
FIG. 4 shows graphs illustrating aberration curves of Embodiment 2.
Figure 4:
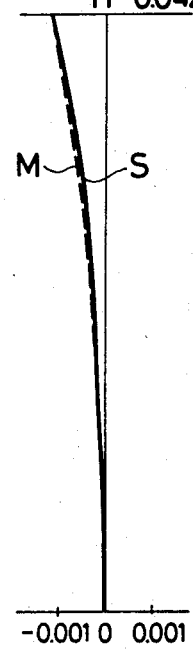
Figure 4:
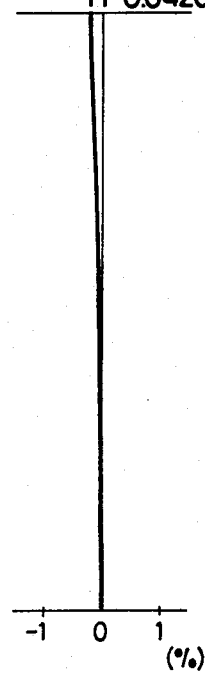
Figure 5:
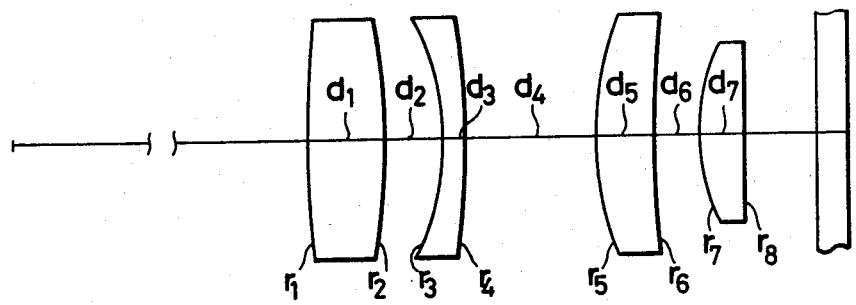
FIG. 5 shows a sectional view of Embodiment 3.
Figure 6:
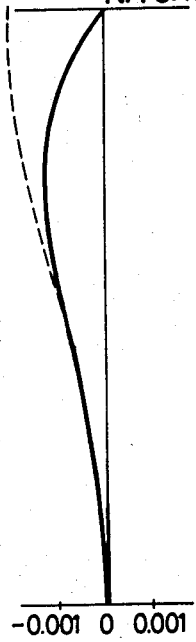
FIG. 6 shows graphs illustrating aberration curves of Embodiment 3.
Figure 6:
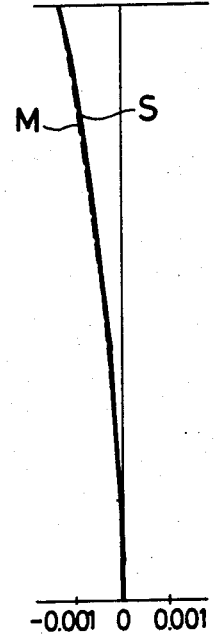
Figure 6:
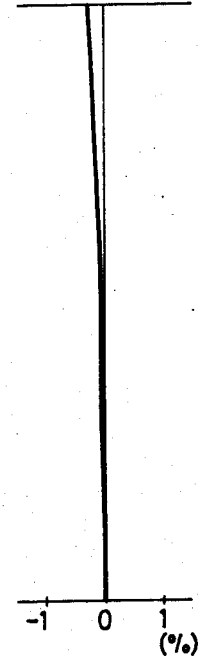

Out of the above embodiments, Embodiment 1 has lens configuration as shown in FIG. 1 and aberration curves as shown in FIG. 2. Embodiment 2 has lens configuration as shown in FIG. 3 and aberration curves as shown in FIG. 4. Embodiment 3 has lens configuration as shown in FIG. 5 and aberration curves as shown in FIG. 6.

The above-mentioned reproducing objective for video disks according to the present invention satisfies the afore-mentioned requirements. Especially, its weight is about 3g and is extremely light compared with the known objectives (about 7g).

I claim:

1. A reproducing objective for video disks comprising a first, second, third and fourth lenses arranged in the order from the reproducing light source side, said first lens being a biconvex lens, said second lens being a negative meniscus lens, said third lens being a positive lens, said fourth lens being a positive lens, said reproducing objective for video disks satisfying the following conditions:
   (1) $-1.5f < r_3 < -0.9f$
   (2) $0.7f < r_7 < 1.1f$
   (3) $[0.4f < d_4] 0.5f < d_4 < 0.6f$
   (4) $[n_1, n_3, n_4 < 1.7] n_1, n_3, n_4 = 1.77861$
   (5) $[n_2 < 1.6] n_2 = 1.51462$ wherein reference symbol $r_3$ represents the radius of curvature of the surface on the reproducing light source side of the second lens, reference symbol $r_7$ represents the radius of curvature of the surface on the reproducing light source side of the fourth lens, reference symbol $d_4$ represents the airspace between the second and third lenses, reference symbols $n_1$, $n_2$, $n_3$ and $n_4$ respectively represent refractive indices of respective lenses, and reference symbol $f$ represents the focal length of the lens system as a whole.

2. A reproducing objective for video disks according to claim 1, in which said reproducing objective for video disks has the following numerical data:

| | | | |
|---|---|---|---|
| $r_1 = 2.9238$ | | | |
| | $d_1 = 0.3041$ | $n_1 = 1.77861$ | $\nu_1 = 25.7$ |
| $r_2 = -2.6473$ | | | |
| | $d_2 = 0.1825$ | | |
| $r_3 = -1.2166$ | | | |
| | $d_3 = 0.1217$ | $n_2 = 1.51462$ | $\nu_2 = 64.1$ |
| $r_4 = -4.1754$ | | | |
| | $d_4 = 0.5669$ | | |
| $r_5 = 1.5555$ | | | |
| | $d_5 = 0.1947$ | $n_3 = 1.77861$ | $\nu_3 = 25.7$ |
| $r_6 = 5.6725$ | | | |
| | $d_6 = 0.1642$ | | |
| $r_7 = 0.8831$ | | | |
| | $d_7 = 0.3759$ | $n_4 = 1.77861$ | $\nu_4 = 25.7$ |
| $r_8 = \infty$ | | | |
| | $f = 1.0$ | $\beta = 1/20X$ | N.A. $= 0.45$ | wherein reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$ through $n_4$ respectively represent refractive indices of respective lenses at $\lambda = 6328\text{Å}$, reference symbols $\nu_1$ through $\nu_4$ respectively represent Abbe's numbers of respective lenses for d-line, reference symbol $f$ represents the focal length of the lens system as a whole, reference symbol $\beta$ represents magnification when the light source is focused, reference symbol N.A. represents the numerical aperture.

3. A reproducing objective for video disks according to claim 1, in which said reproducing objective for video disks has the following numerical data:

| | | | |
|---|---|---|---|
| $r_1 = 7.7767$ | | | |
| | $d_1 = 0.3034$ | $n_1 = 1.77861$ | $\nu_1 = 25.7$ |
| $r_2 = -2.3979$ | | | |
| | $d_2 = 0.2937$ | | |
| $r_3 = -0.9709$ | | | |
| | $d_3 = 0.1080$ | $n_2 = 1.51462$ | $\nu_2 = 64.1$ |
| $r_4 = -1.8606$ | | | |
| | $d_4 = 0.5425$ | | |
| $r_5 = 2.2864$ | | | |
| | $d_5 = 0.2027$ | $n_3 = 1.77861$ | $\nu_3 = 25.7$ |
| $r_6 = -13.2104$ | | | |
| | $d_6 = 0.1735$ | | |
| $r_7 = 0.9549$ | | | |
| | $d_7 = 0.3811$ | $n_4 = 1.77861$ | $\nu_4 = 25.7$ |
| $r_8 = \infty$ | | | |
| | $f = 1.0$ | $\beta = 1/20X$ | $N.A. = 0.45$ | wherein reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$ through $n_4$ respectively represent refractive indices of respective lenses at $\lambda = 6328$Å, reference symbols $\nu_1$ through $\nu_4$ respectively represent Abbe's numbers of respective lenses for d-line, reference symbol f represents the focal length of the lens system as a whole, reference symbol $\beta$ represents magnification when the light source is focused, reference symbol N.A. represents the numerical aperture.

4. A reproducing objective for video disks according to claim 1, in which said reproducing objective for video disks has the following numerical data:

| | | | |
|---|---|---|---|
| $r_1 = 2.8521$ | | | |
| | $d_1 = 0.3111$ | $n_1 = 1.77861$ | $\nu_1 = 25.7$ |
| $r_2 = -2.5399$ | | | |
| | $d_2 = 0.2348$ | | |
| $r_3 = -1.0728$ | | | |
| | $d_3 = 0.1001$ | $n_2 = 1.51462$ | $\nu_2 = 64.1$ |
| $r_4 = -2.7654$ | | | |
| | $d_4 = 0.5352$ | | |
| $r_5 = 1.3446$ | | | |
| | $d_5 = 0.2265$ | $n_3 = 1.77861$ | $\nu_3 = 25.7$ |
| $r_6 = 3.6180$ | | | |
| | $d_6 = 0.1847$ | | |
| $r_7 = 0.7797$ | | | |
| | $d_7 = 0.1788$ | $n_4 = 1.77861$ | $\nu_4 = 25.7$ |
| $r_8 = \infty$ | | | |
| | $f = 1.0$ | $\beta = 1/20X$ | $N.A. = 0.45$ | wherein reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$ through $n_4$ respectively represent refractive indices of respective lenses at $\lambda = 6328$Å, reference symbols $\nu_1$ through $\nu_4$ respectively represent Abbe's numbers of respective lenses for d-line, reference symbol f represents the focal length of the lens system as a whole, reference symbol $\beta$ represents magnification when the light source is focused, reference symbol N.A. represents the numerical aperture.

* * * * *